United States Patent [19]
Gatherer et al.

[11] Patent Number: 5,889,691
[45] Date of Patent: Mar. 30, 1999

[54] APPARATUS AND METHOD FOR A MULTIPLIER UNIT WITH HIGH COMPONENT UTILIZATION

[75] Inventors: Alan Gatherer, Richardson; Carl E. Lemonds, Garland, both of Tex.

[73] Assignee: Texas Instruments Incorporated, Dallas, Tex.

[21] Appl. No.: 782,001

[22] Filed: Jan. 6, 1997

[51] Int. Cl.[6] .................................................. G06F 7/52
[52] U.S. Cl. ................ 364/759; 364/760.03; 364/760.05
[58] Field of Search ............................... 364/754.01, 757, 364/758, 759, 760.05, 760.01, 760.02, 760.03, 760.04

[56] References Cited

U.S. PATENT DOCUMENTS

| | | | |
|---|---|---|---|
| 2,429,228 | 10/1947 | Herbst ...................................... | 364/758 |
| 2,941,720 | 6/1960 | Marshall, Jr., et al. ................. | 364/758 |
| 4,796,219 | 1/1989 | Williams .................................. | 364/758 |
| 4,811,269 | 3/1989 | Hirose et al. ............................ | 364/759 |
| 5,262,975 | 11/1993 | Ohki ........................................ | 364/757 |

FOREIGN PATENT DOCUMENTS 0 517 241 A   5/1992   European Pat. Off. .

OTHER PUBLICATIONS

Fan et al., "Data Formats and Arithmetic Operators for Serial/Parallel Trade–Offs in Pipelined Architectures", Proceeding of the International Symposium on Circuits and Systems, New Orleans, May 1–3, 1990, vol. 2 of 4, 1 May 1990, *Institute of Electrical and Electronics Engineers*, pp. 1248–1251.

Esteban, "Time–Shared Shift Accumulator", *IBM Technical Disclosure Bulletin*, vol. 15, No. 3, Aug. 1972, New York, pp. 763–764, XP002056987.

Buckle et al., "Programmable Shift Registers for Numerical Multiplication", *Radio and Electronic Engineer*, vol. 44, No. 2, Jan. 1974, London, pp. 33–38. XP002056988.

*Primary Examiner*—Ayaz R. Sheikh
*Assistant Examiner*—Douglas S. Lee
*Attorney, Agent, or Firm*—Carlton H. Hoel; W. James Brady; Richard L. Donaldson

[57] ABSTRACT

In a multiplier unit having a preprocessor stage, a multiplier stage, and a summation stage, the multiplier stage includes a shift register, a gate component for controllably transmitting the multiplicand A in a manner determined by a bit signal of multiplier B applied to the gate component control terminal. Partial products are grouped by multiplicand digits and each digit is applied, through delay components determined by the order of the digit, to first terminals of an associated adder components. Output signals from each adder component is transmitted through a plurality of delay components and applied to second input terminals of the same adder component. In this manner, partial products $A_p * B_q$ are assembled and the partial products $(A_0 + \ldots A_M) * B_q = A * B_q$ can be applied to the summation unit in a single period. When the multiplier is an integer multiple of the multiplicand, the implementation is particularly convenient.

1 Claim, 4 Drawing Sheets

APPARATUS AND METHOD FOR A MULTIPLIER UNIT WITH HIGH COMPONENT UTILIZATION

BACKGROUND OF THE INVENTION

1. Field of the Invention

This invention relates to components of a data processing system and, more particularly, to data processing system multiplier components. The data processing system multiplier components multiply a multiplicand represented by data bits by a multiplier represented by data bits.

2. Description of the Related Art

In the related art, multiplier units, such as the booth multiplier unit or the parallel multiplier unit, typically have a low utilization of components. This low utilization is the result of the time for data to ripple through the multiplier unit. In both of the cited multiplier configurations, the ripple time results from the time for the data to be processed by the summation stage of the multiplier unit. In the past, in order to reduce the ripple time, carry look-ahead circuits have been implemented. However, the implementation of carry look-ahead circuits provides a significant increase in the complexity and number of components needed for the multiplier unit.

Referring to FIG. 1, the multiplier unit for the multiplication of a binary multiplicand A by a binary multiplier B unit can typically be divided into three stages. The first stage is a preprocessing of multiplicand A stored in register 10 by preprocessor stage 11 to simplify the apparatus used to implement the multiplication procedure. The digit generator component 13 next provides the $i^{th}$ digit of the multiplier B stored in register 20, i.e., $B_i$. The product $A*B_i$ is generated in the second stage or the multiplier stage 12. In the third stage or the summation stage 14, the sum of $A*B_i$ is generated, this partial product being shifted by $S_i$, i.e., the position of the multiplier bit $B_i$ in the multiplier register 20. The operation of these three stages generate the desired result because $B=\text{SUM}(i)\{B_i 2^{S_i}\}$. For example, in a simple shift and add multiplier unit, the preprocessor stage 11 is inactive. The multiplier stage 12 multiplies A by either 1 or 0, this binary bit being the $i^{th}$ digit of B. The summation stage 14 shifts the products by $S_i$ and adds all the results together.

In this example, most of the complexity is in the third or summation stage. The second or multiplier stage is relatively simple because the "digits" of the multiplier are either 1 or 0. The utilization of the adder components is low because in third or summation stage 14, the additions take place serially and are added to a single running sum. However, in many instances of multiplier units, a longer time for performing the multiplication function can be tolerated when fewer components are needed to perform the multiplication operation.

A need has therefore been felt for apparatus and a related method to provide for a higher utilization of the components of the multiplier unit. The higher component utilization results in a greater number of processing cycles to implement a multiplication procedure. In addition, it is further desirable that much of the addition of partial products be performed in the second or multiplier stage resulting in relatively little carry-ripple activity in the third or summation stage.

SUMMARY OF THE INVENTION

The aforementioned and other features are accomplished, according to the present invention, by a multiplier unit having the typical organization, a preprocessor stage, a multiplier stage, and a summation stage. However, in the present invention, the register storing the multiplicand is a shift register. The multiplier stage includes a gate component which controllably transmits appropriately shifted multiplicand in response to a multiplier logic signal subdigit applied to the control terminal of the gate component. The multiplier stage also includes a plurality of adder components, each adder component being associated with a (typically multiple logic signal) digit of the multiplicand (the digit of the multiplicand being shifted in a cycle-dependent manner after the first adder unit cycle). First input terminals of each adder unit have delay components coupled in series, the number of delay components being a function of the position of the associated multiplicand digit and the number of digits of the multiplier. The output terminal of each adder unit is applied to a series of K (K being the number of digits into which the multiplier is divided and P is the number of digits into which the multiplicand is divided) delay components, the output of the K delay components being coupled to second input terminals of the same adder component. In this manner, the partial products $A_p * B_k$ can be generated, $A_p$ and $B_k$ being multiplicand and multiplier digits, respectively. By proper selection of the signals stored in the delay components, the partial products $A*B_0$ through $A*B_{K-1}$ can be applied to the summation stage of the multiplier unit on successive cycles. When the number of logic signals of the multiplier is a integer multiple of the logic signals comprising the multiplicand, the implementation of the multiplier unit is particularly convenient.

These and other features of the present invention will be understood upon the reading of the following description in conjunction with the Figures.

BRIEF DESCRIPTION OF THE DRAWINGS

FIG. 3A illustrates the identity of the contents of the delay components in the least significant digit data path and the next least significant digit data path of apparatus of FIG. 2 after a first multiplier cycle, while

DESCRIPTION OF THE PREFERRED EMBODIMENT(s)

1. Detailed Description of the Drawings

Figure 1:
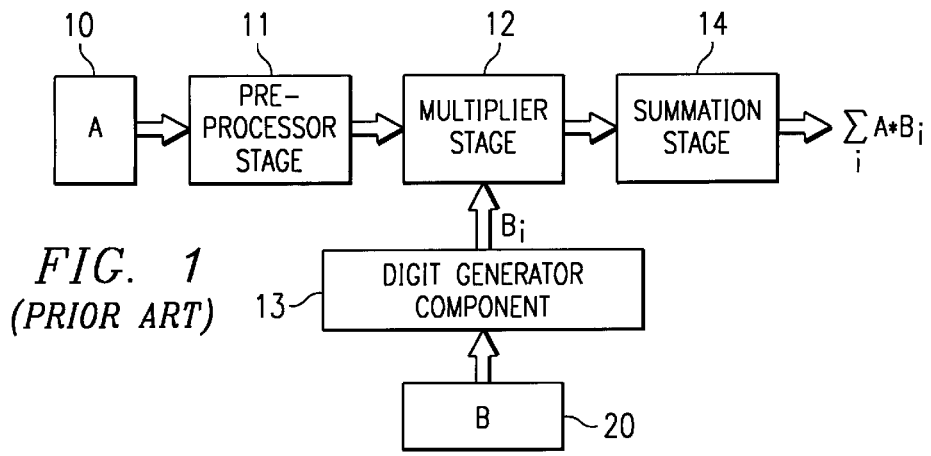
FIG. 1 is a block diagram illustrating the general architecture of a three stage multiplier unit.

FIG. 1 has been described with respect to the related art.

Figure 2:
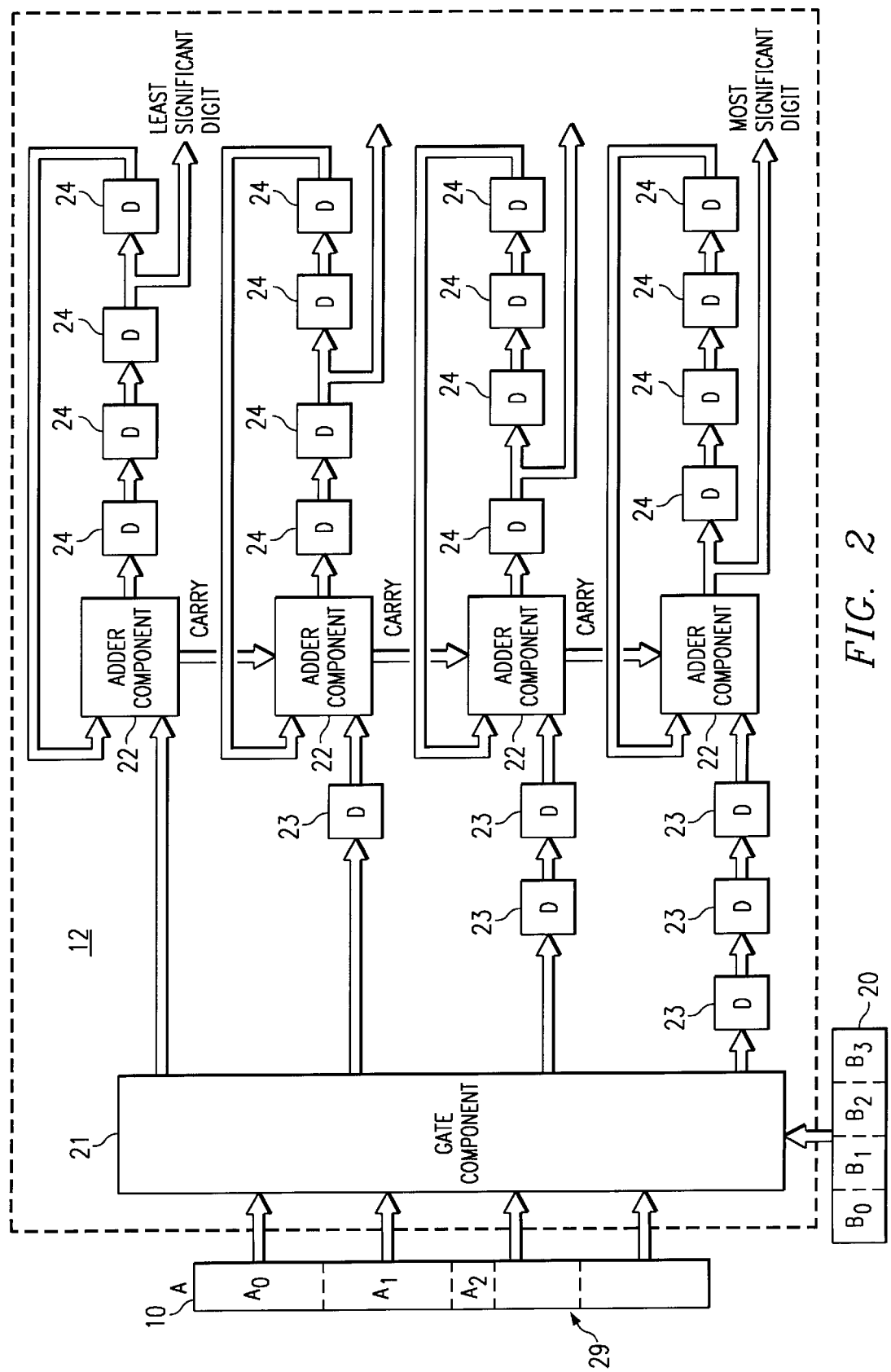
FIG. 2 is a block diagram of the second or multiplier stage of a three stage architecture according to the present invention.

Referring to FIG. 2, a block diagram of the second or multiplier stage 12 of a multiplier unit according to the present invention is shown. The multiplicand A has M logic signals and is divided into P digits or groups of logic signals, the digits being labelled $A_0$–$A_{P-1}$. The multiplicand A is stored in register 10 shown in FIG. 1. Note that register 10 has an additional portion 29. The multiplicand A is shifted during the operation of the multiplier and the larger register is needed to accommodate this shifting. The multiplicand A is applied to a gate component 21. The transmission of the multiplicand A through the gate component 21 is determined by which logic bit of the multiplier B is applied to a control terminal of gate component 21. Whether the gate component transmits the bits of multiplicand A or transmits O bits depends on the logic state of the bit applied to the control terminal of the gate component 21. The multiplier B is divided into a K digits or groups of logic signals, i.e., $B_0$-$B_{K-1}$. The transmitted signals from the gate component 21 are applied to series of K adder units 22. The least significant digit of multiplicand A, $A_0$, when transmitted by the gate component 21, is applied directly to the first (i.e., least significant) adder component 22. The second least significant digit of multiplicand A, $A_1$, when transmitted by the gate component 21, is applied through a single delay component 23 to the second (i.e., next least significant) adder component 22. Each additional digit of A, transmitted by the gate component 21, is applied to an associated (i.e., increasingly significant) adder component 22 through one additional delay component 23. The most significant digit, $A_{P-1}$, when transmitted by the gate component 21, is applied to the associated adder unit 22 through P−1 delay components 23. The output signal of the adder units 22 are each applied to the K delay components 24 coupled in series. The output of the last delay component 24 is coupled to a second input terminal of the associated adder component 22. The least significant digit output signal is taken from the input terminal of the last of the K delay components coupled to the adder unit 22 associated with the least significant digit of the multiplicand, $A_0$. The next least significant digit is provided from the input of the next to last delay component 24 associated with the adder component 22 receiving the next least significant digit of the multiplicand, $A_1$. The most significant output digit is provided from the adder component 22 receiving the most significant bit from the multiplicand, $A_{P-1}$. A carry-out bit is applied from an adder component 22 to a carry-in terminal of the adder component 23 associated with the next higher multiplicand digit. The multiplier is N bits in length. When the multiplicand has M bits and is stored in the M less significant bits of register 10 (register 10 being M+L bits in length), the M+L bits being divided into K digits with (M+L)/K logic bits. The multiplier is N bits in length, the N bits being divided into K digits with N/K=L logic bits. The adder component in the multiplier stage is M+L bits in length and each multiplier stage adder components 22 are (M+L)/K logic bits in length. Each adder component 22 receives its input signals one cycle or clock period after the previous adder component 22 received its input signals. Because of the reduced adder component 22 length resulting from the skewed application of partial products, the critical path is reduced.

Figure 3A:
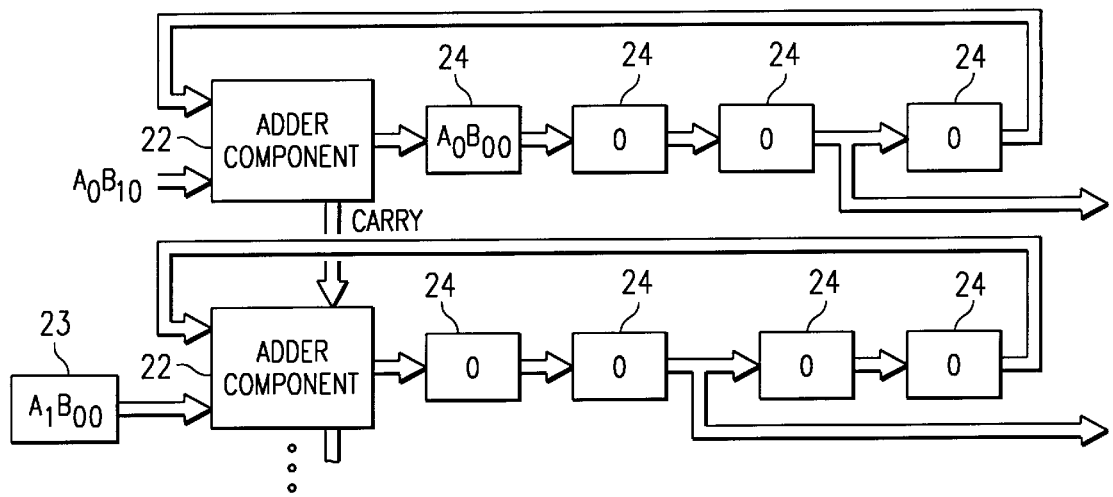
Figure 3B:
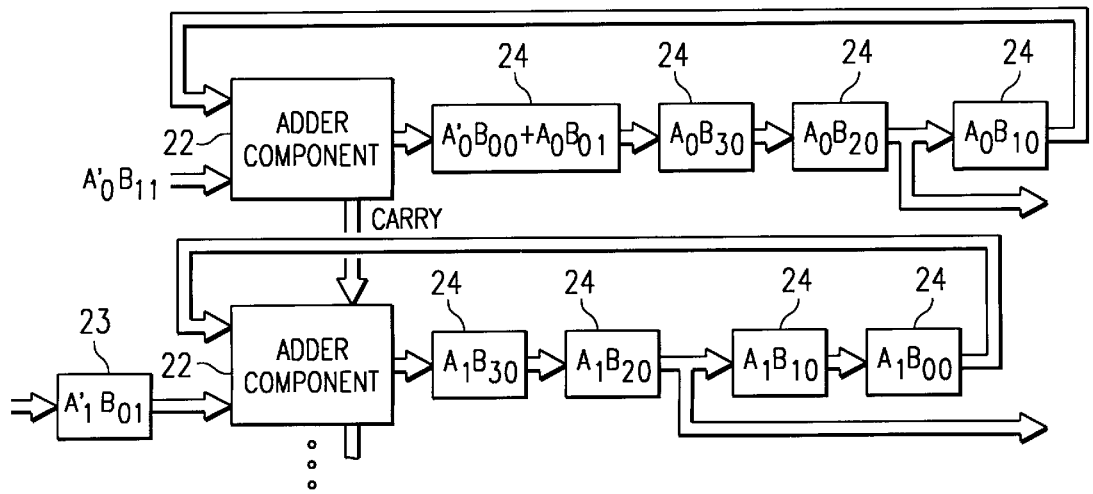
FIG. 3B illustrates the contents of the delay elements in the least significant digit data path and the next least significant digit data path of the apparatus of FIG. 2 after five multiplier cycles.

Referring to FIG. 3A, the contents of the delay components 23 and 24 associated with the adder component 22 receiving the least significant digit from the multiplicand and the contents of delay components 23 and 24 associated with the adder unit receiving the next least significant digit from the multiplicand are shown after one time period T of operation of the multiplier unit in FIG. 2. In FIG. 3B, the contents of the same delay components 23 and 24 are shown after 5 time periods T, the multiplier being divided into 4 digits.

Figure 4:
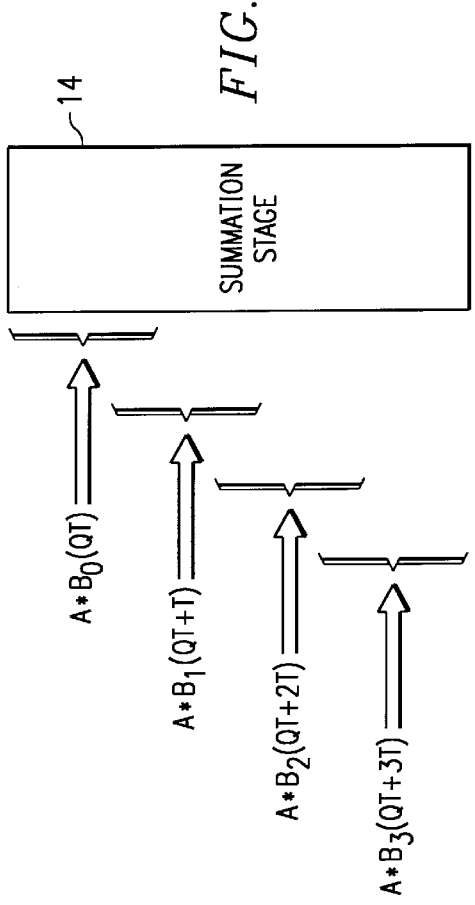
FIG. 4 is a block diagram illustrating the application of partial products from multiplier stage to the summation stage of a multiplier unit according to the present invention.

Referring to FIG. 4, the signals applied to the summation stage 14, according to the present invention, is shown. After Q=(N+K−1) cycles or time periods T, output of multiplier unit 12 is $A*B_0$. During the next time period, i.e. (N+K) cycles or time periods, the output of the multiplier unit is $A*B_1$. During the subsequent 2 time periods, the output of the multiplier unit is $A*B_2$ and $A*B_3$ is provided. These partial products are added in sequence in the summation stage 14.

Figure 5:
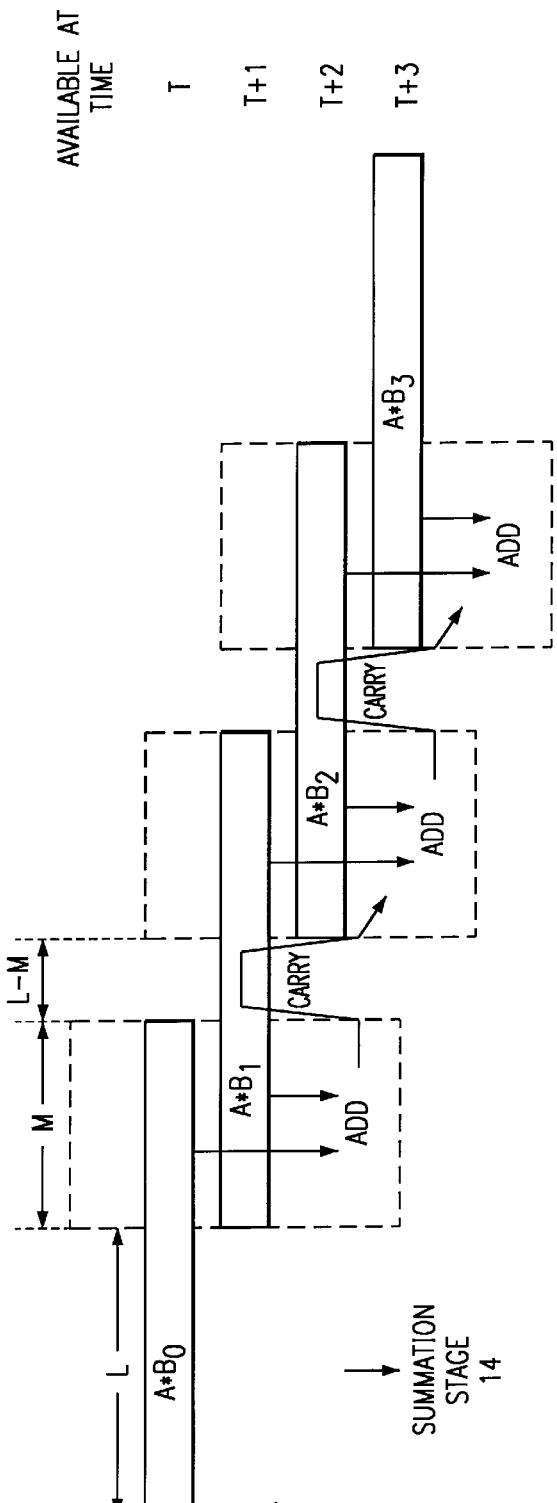
FIG. 5 is an expanded view of the overlap of the partial products provided by the multiplier stage to the summation stage of the multiplier unit of FIG. 2.

Referring to FIG. 5, the output logic signals for partial products from the multiplier stage 12 is shown. M is the number of bits of the multiplicand, while L is the number of logic signals for each of the multiplier digits. The K partial products from the multiplier stage 12 to be applied to the summation stage 14 is L+M bits in width. The multiplier unit is configured wherein each of the K partial products is available on succeeding clock cycles because of the skewing resulting from the delay components 23. Each of the K partial products is shifted by L bit positions with respect to the previous partial product from the multiplier stage 12.

Figure 6:
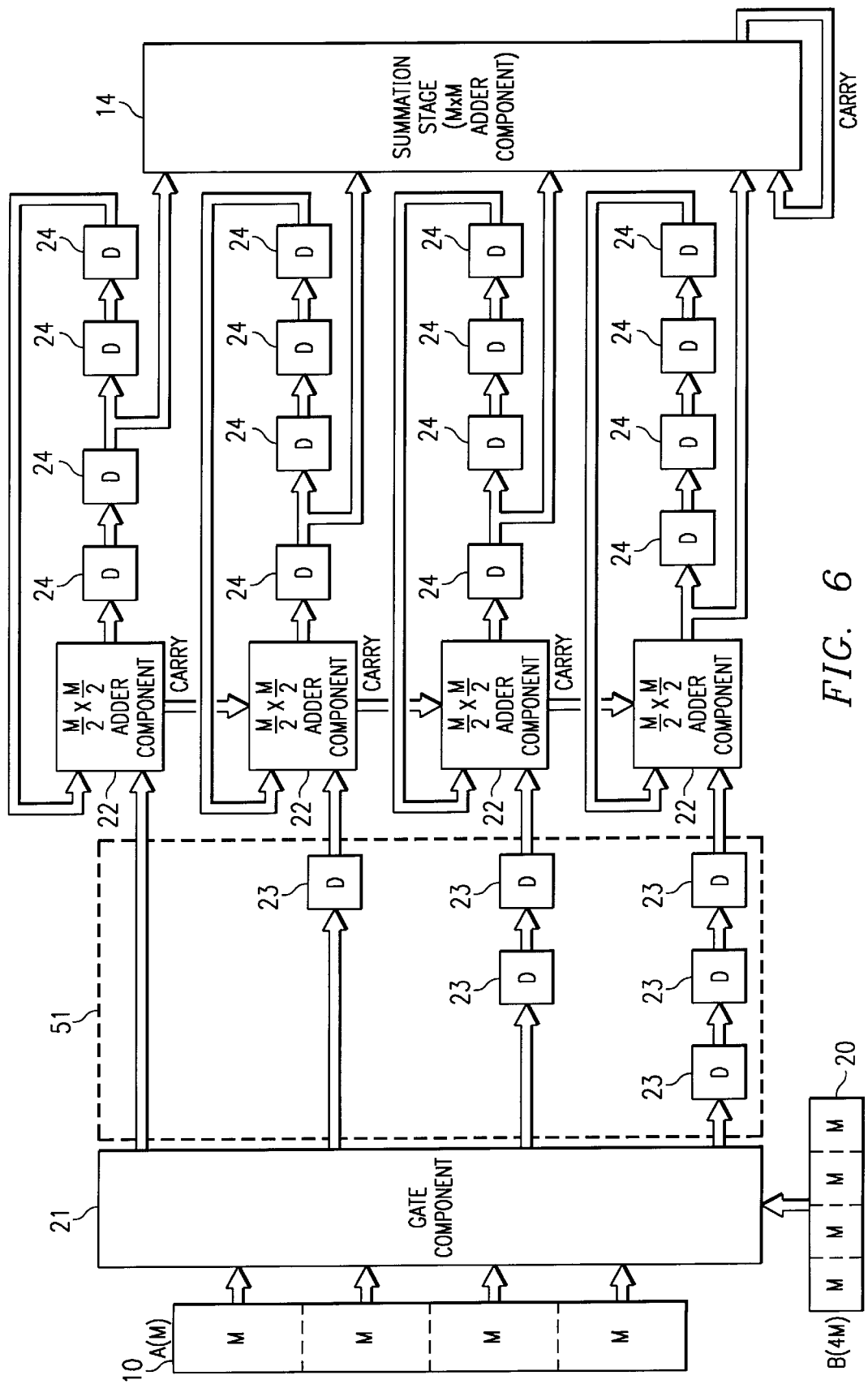
FIG. 6 is a block diagram illustrating a special case of the present invention.

Referring to FIG. 6, an implementation of the present invention for the situation wherein the multiplier B is a multiple R (i.e., 4) of the multiplicand A is shown. The configuration is similar to that of FIG. 2. However, the output for the least significant digit from the multiplier stage is taken from the input to the next to last delay component 24. Both of the next two digits are received from the input to the delay line 24 preceding the next to the last delay line 24. The most significant digit is taken from the output of the adder unit 22, i.e., the adder unit 22 associated with the most significant digit of the multiplicand. In general, the most significant half of the output signals of the multiplier stage 12 are delayed by one cycle or time period compared to the least significant half of the signals.

2. Operation of the Preferred Embodiment(s)

The present invention can be understood in the following manner. Referring to FIG. 2, the partial product of $B_{00}$ (i.e., the first bit of the first multiplier digit) and multiplicand A is entered in the adder units (an adder unit includes the adder and delay components) and stored. The partial product of $B_{10}$ (the first bit of the second multiplier digit) is then entered in the adder unit and stored. This process is continued until all the partial products of the multiplicand A and all the first bits of the multiplier digits are stored {i.e., $A*(B_{00}+ \ldots +B_{(K-1)0})$}. Then, multiplicand A is shifted in register 10 one bit position and the foregoing process is repeated with the exception that the partial products of the same multiplier digit position are combined. This process is repeated for each bit position of the multiplier digits. Referring to FIG. 2, as a result of the skewing resulting from the delay components 23, the delay components 24 accumulate partial products of $A_p*B_k$. The manner in which the output signals are extracted from the delay components 24, i.e., the partial products are obtained from one additional delay line for each increase in adder significance, results in partial products $A*B_k$ being applied to the summation unit 14 during consecutive time periods. The K partial products from the multiplier stage 12 are shifted by Ki increments and the K partial products can be processed separately or combined. Because the digits do not overlap in binary representation, the results to be added overlap only by M, the size of the multiplicand A. These partial products can therefore be added using M length adders in the summation stage 14. The overlap of the partial products in shown in FIG. 5. FIG. 5 also illustrates a carry ripple of length L−M. Provided L≧M, addition in the summation stage can be performed using a length M adder and a length L−M carry propagate unit. Thus the summation stage can be implemented by a fast shift of length L and an M bit adder unit.

When L=M, the adder of the present invention can be implemented as shown in FIG. 5. The most significant half of the multiplier stage at time period T is added to the least significant half at time T+1. The resultant carry is then carried into the next add operation. The partial products leave the multiplier in M slices. The most significant and least significant portions can be directly added to produce the desired result (except that the first output is the least significant half). The gate and shift component which is included in the general implementation can be included in the shift operation of the preprocessor stage 11.

The present invention results in a greater usage of components at the expense of additional latency. The adder units 22 are used a multiplicity of times during the accumulation of the $A_p*B_k$ partial products.

Referring once again to FIG. 5, the summation stage includes a ripple carry of length L−M bits that connects the carry-out of addition to the carry-in of the another addition. When L≧M, the addition is simplified because the addition can be performed with an adder of length M bit positions and a length L−M bit position carry propagate unit. When L−M=0, only a routing of length L and an M bit adder unit with carry apparatus is needed to implement the summation stage.

The present invention is intended to utilize less apparatus while requiring a greater number of cycles to execute the multiplication operation. The latency for the partial product $A_0*B_0$ is N cycles, while the latency for the partial product $A*B_0$ is N+K−1 cycles. However, the latency can be reduced by increasing the amount of apparatus. For example, by appropriate increase in the complexity of the apparatus of the gate component 21, two (or more) bits from the multiplier B could be applied added to the gate component 21 and these bits "encoded" with multiplicand A before being applied to the remainder of the multiplier stage. The latency can thus be improved, but at the expense of an increase in the amount of apparatus. Furthermore, the delay components coupled to the input terminals of the adder components can be eliminated by increasing the complexity of the gate component, i.e., by appropriate shifting (or routing) of portions of the multiplicand A.

While the invention has been described with particular reference to the preferred embodiment, it will be understood by those skilled in the art that various changes may be made and equivalents substituted for elements of the preferred embodiment without departing from the invention. In addition, many modifications may be made to adapt a particular situation and material to a teaching of the present invention without departing from the essential teachings of the present invention.

As is evident from the foregoing discussion, certain aspects of the invention are not limited to the particular details of the examples illustrated, and it is therefore contemplated that other modifications and applications will occur to those skilled in the art. It is accordingly intended that the claims shall cover all modifications and applications as do not depart from the spirit and scope of the invention.

What is claimed is:

1. A multiplier, comprising:

(a) a shift register of L+M bits divided into K sections of (L+M)/K bits each, where K, L, and M are positive integers greater than 1;

(b) K adders $ADD_0$, $ADD_1$, . . . $ADD_{K-1}$, each of said adders $ADD_J$ having (1) a first input of size (L+M)/K bits coupled through a gate component and J delays to a corresponding one of said shift register sections, (2) a second input of size (L+M)/K bits coupled through a feedback loop of K delays to a sum output of said $ADD_J$, and (3) for J=0,1, . . . , K−2 a carry output coupled to a carry input of $ADD_{J+1}$;

(c) a summation stage with K inputs coupled to corresponding ones of said feedback loops with the coupling to the feedback loop of $ADD_J$ being immediately before K−J delays from said sum output;

(d) a gate component control of K*L bits;

(e) whereby a multiplicand A of M bits in said shift register and a multiplier B of K*L bits in said gate component control may be multiplied by iteratively using the bits of said multiplier B to pass or block bits of said multiplicand A passing to said adders $ADD_0$ . . . $ADD_{K-1}$ wherein said iteratively using has an inner loop of K iterations each using a bit from one of K sections of B and an outer loop of L iterations each applying the inner loop after said multiplicand is shifted a bit in said shift register.

* * * * *